April 25, 1933.  L. RADO  1,906,199
METAL FILM
Filed Feb. 10, 1928
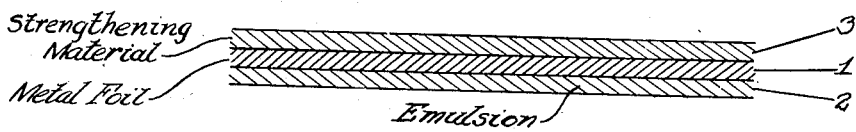
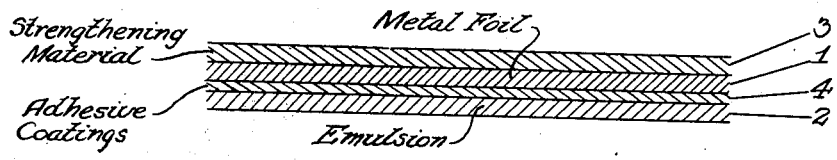
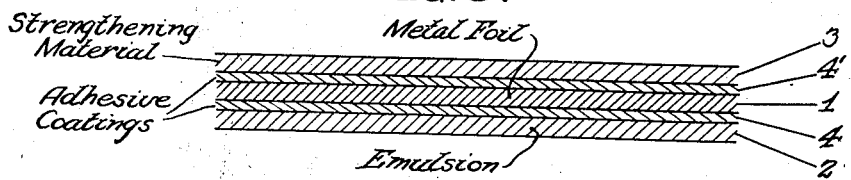
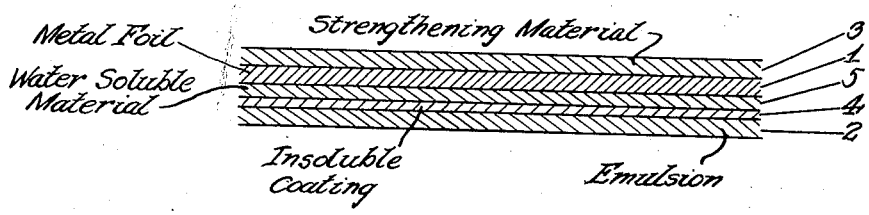
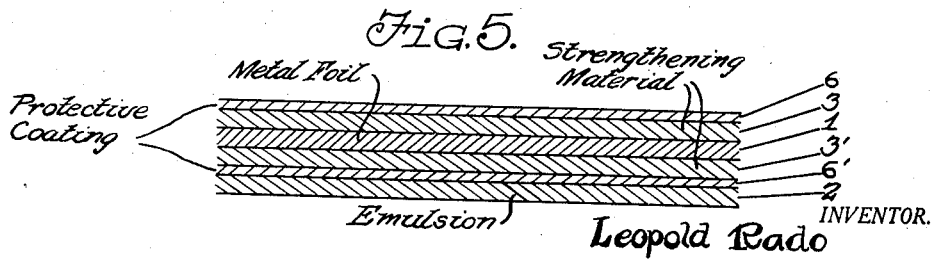
INVENTOR.
Leopold Rado
BY Foster + Codier
ATTORNEY.

Patented Apr. 25, 1933

1,906,199

UNITED STATES PATENT OFFICE

LEOPOLD RADO, OF BERLIN-HALENSEE, GERMANY

METAL FILM

Application filed February 10, 1928, Serial No. 253,515, and in Germany November 14, 1927.

This invention relates to a metal film which completely eliminates the drawbacks of the known metal film.

The metal film according to the present invention possesses the necessary elasticity and firmness and permits the application of the emulsion in such a manner, that the same cannot crack or come off during the performance in consequence of bending.

The metal film essentially comprises a very thin metal foil, which is united with an elastic and sufficiently strong base of paper, cellulose, viscose, celluloid or the like, and serves as support of the sensitive emulsion. For instance an aluminium foil of a thickness of 0,005 to 0,008 millimetres is used as the metal foil. The base of paper or the like is affixed to the metal foil by an adhesive substance which preferably is insoluble in water. The side of metal foil away from the elastic base is roughened, in order to provide for a good adhesion of the emulsion on the metallic surface and to improve for photographic copies the distribution of light by reflection. The metal foil is roughened in the known chemical or mechanical manner.

In order to provide for a satisfactory adhesion of the sensitive emulsion, the metal side of the support may be provided at first with a transparent coating, for instance of cellulose, celluloid, viscose or the like. Before applying this transparent coating it is of advantage to roughen the metal foil by brushing or the like. According to the present invention this transparent layer, which is disposed between the metal foil and the emulsion may be utilized as carrier of the colour, which the ready film ought to show.

If desired a base consisting of a transparent material, such as for instance cellulose, celluloid, viscose or the like, may be provided at both sides of the metal foil.

The individual layers of the support are united by means of suitable water-insoluble binding means, the transparent layers by transparent binding means. The cellulose, viscose, celluloid or like layers may be applied in a liquid condition to the metal film and are allowed to harden. The transparent cellulose, celluloid, viscose or like coating, which promotes the adhesion of the emulsion, can be produced per se and united with the metal foil by suitable binding means.

It has been found, that the hygroscopic layers of the metal film preferably are rendered indifferent against the influence of dampness. Thus if layers consisting of cellulose or other substances, which are liable to be affected by water, are employed in connection with the metal film, it is of advantage to cover these layers with a water-proof coating, for instance a celluloid varnish, nitro varnish or the like.

In order to clearly illustrate my invention I have constructed Figures 1, 2, 3, 4 and 5 showing various modifications which my invention may take.

These figures are magnified cross sections of portions of film and it is not to be understood that any of the dimensions shown are to be considered as relevant to the invention.

In Figure 1, 1 illustrates the metal foil, 2 the emulsion applied to one face thereof and 3 is a coating applied to the other face of the metal foil to give strength thereto.

In Figure 2, 1 is again a metal foil, 2 the emulsion and 3 and 4 are coatings which may be the same or different, but which are applied on opposite sides of 1 to give strength thereto.

In Figure 3 it will be seen that on either side of the metal foil 1 there is a coating 4 and 4' which may be either soluble in water or insoluble therein, and which will serve to unite 2 and 3 to the metal foil 1.

Figure 4 shows a modification wherein a water soluble material 5 on one side of the metal foil 1 is covered with an insoluble coating 4 which joins to the emulsion 2. 3 is of course a material giving sufficient strength to the film.

Figure 5 shows a metal foil 1 covered on both sides with a material capable of giving it strength, which is numbered 3 on one side and 3' on the other side. These materials may be identical or may be different in their composition, but in this modification they are considered to be somewhat hygroscopic. On the outside of 3 there is a protective coating 6 and on the outside of 3' there is a protective coating 6'. To this latter is joined the emulsion 2. It will be understood that 3' and 6' are transparent and one or both of these may if desired be colored to impart color to the final picture.

These illustrations are to be taken as modifications only which I may use for my invention and are not intended to illustrate all possible forms thereof.

The metal film according to the present invention is treated in the usual manner and either may be cut to the desired size or may be provided with the necessary perforations and used as film-band.

The metal film according to the invention is very strong and flexible. A breaking or cracking of the metal foil is positively prevented by combining the latter with an elastic base, so that cracks cannot form during ordinary use.

I claim—

1. A metal film for photographic and kinematographic purposes, comprising in combination a metal foil having a thickness between 0.005 and 0.008 mm., and sensibly roughened at one of its sides, an elastic base of sufficient strength united with the said roughened side of the metal foil.

2. A metal film for photographic and kinematographic purposes, comprising in combination a very thin metal foil roughened at one of its sides, a transparent coating united with the roughened side of the foil, a sensitive emulsion applied to the said coating and an elastic base of sufficient strength affixed to the other side of the metal foil.

3. A metal film as set forth in claim 2, in which the individual layers are united by means of water insoluble binding means, and the transparent coating by means of transparent binding.

4. A metal film as set forth in claim 2, in which the transparent coating disposed beneath the emulsion is dyed.

5. A metal film for photographic and kinematographic purposes, comprising in combination a very thin metal foil roughened at one of its sides, and an elastic base of sufficient strength united with the roughened side of the metal foil.

LEOPOLD RADO.